United States Patent Office 3,164,625
Patented Jan. 5, 1965

---

3,164,625
SUBSTITUTED DI-p-XYLYLENES
Dale F. Pollart, Somerville, N.J., assignor to Union Carbide Corporation, a corporation of New York
No Drawing. Filed Mar. 1, 1962, Ser. No. 176,796
2 Claims. (Cl. 260—465)

This invention relates to a method for preparing substituted di-p-xylylenes and more particularly to mono-cyano - di - p - xylylene and mono - carboxamido-di-p-xylylene.

Although substituted di-p-xylylenes and particularly certain members of the halogenated species are known in the art, there has heretofore been proposed no successful method for preparing the monomeric cyano-di-p-xylylenes or carboxamido-di-p-xylylene. Previously proposed techniques for substituting cyano groups onto aromatic nuclei have not met with a substantial degree of success because of the unpredictable chemical behavior of the cyclic di-p-xylylene represented by the general formula:

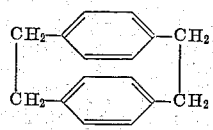

Basic reactions normally attributed to aromatic compounds are not particularly applicable to the di-p-xylylene because of the close proximity of the aromatic nuclei with resultant electronic interaction between $\pi$-electrons of the two aromatic rings. In addition the aromatic nuclei of such compounds are distorted from their normal planar configurations giving rise to a strained and somewhat sterically hindered molecule. Molecules possessing such abnormal configurations can well be expected to lead to atypical reactions.

This somewhat unpredictable nature of the di-p-xylylene has effected the securing of a pure substituted di-p-xylylene which is needed for preparing polymers therefrom.

Accordingly, it is an object of the present invention to provide a process for the preparation of mono-cyano-di-p-xylylene and mono-carboxamido-di-p-xylylene.

It is another object of the present invention to provide as novel compositions of matter, mono-cyano-di-p-xylylene and mono-carboxamido-di-p-xylylene.

These and other objects of the present invention are achieved by heating mono-carboxy-di-p-xylylene in contact with an inorganic acid halide and subsequently contacting the reaction mixture with ammonium hydroxide, thereafter isolating the novel compound, mono-carboxamido-di-p-xylylene represented by the general formula:

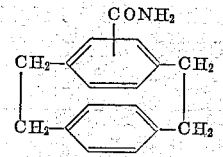

Heating of the thus prepared compound in contact with a dehydrating agent yields the novel compound, mono-cyano-di-p-xylylene represented by the formula:

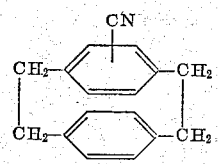

The mono-carboxy-di-p-xylylene precursor has been heretofore prepared by Cram and Allinger, Jr. Am. Chem. Soc. 77, 6289 (1955) from the unsubstituted parent compound, di-p-xylylene by acetylation with acetyl chloride and anhydrous aluminum chloride. The acetylated material can be converted to the mono-carboxy derivative by oxidation with a hypohalite. However, due to the sterically hindered molecule involved and the route used, it has been found that only single substitution on the cyclic di-p-xylylene is possible. Cram and Allinger, supra, found that the acetyl group in one ring thoroughly protected both rings from further electrophilic substitution.

It has now been found that the stable intermediate, mono-carboxamido-di-p-xylylene can be prepared from the mono-carboxy derivative hereinabove described by heating said carboxy derivative in contact with an inorganic acid halide, for example, thionyl chloride, phosphorus trichloride, or phosphorus pentachloride, said inorganic acid halide being present preferably in excess of the stoichiometrically required proportions, and subsequently contacting the reaction mixture with ammonium hydroxide.

In a preferred embodiment of the present invention, the molar ratio of the mono-carboxy-di-p-xylylene to the inorganic acid chloride can range from about 1:1 to 1:10.

The reaction should be maintained at temperatures between about 50° and 150° C., more preferably, at temperatures between about 75° to 85° C.

While not narrowly critical, the reaction should be preformed in the substantial absence of water to avoid the interaction between water and the inorganic acid halide employed.

Contacting the reaction mixture with ammonium hydroxide results in a copious white precipitate of the mono-carboxamido-di-p-xylylene which can be isolated and purified by conventional methods, e.g., filtration and recrystallization. Although the reaction proceeds on an equimolar basis of the acid chloride formed in the reaction and the ammonium hydroxide, an excess of ammonium hydroxide is preferred to assure complete reaction.

It has been found advantageous to employ concentrated ammonium hydroxide, preferably in its commercially available form, i.e., about 28% ammonia by weight. It is also considered preferable that the ammonium hydroxide be maintained at temperatures between about 0° C. and 25° C.

The carboxamido derivatives as hereinabove prepared can be further contacted with a dehydrating agent, for example, thinoyl chloride, phosphorus pentoxide, or phosphorus oxychloride, to form mono-cyano-di-p-xylylene. Preferably, said dehydrating agent being present in excess to avoid decomposition of the dehydrating agent by the water formed. In a preferred embodiment, the molar ratio of the mono-carboxamido-di-p-xylylene to the dehydrating agent can range from about 1:1.5 to 1:15.

The reaction can be maintained at temperatures between about 50° to 150° C. but more preferably, between about 75° to 85° C.

Since the dehydrating agents employed in this reaction interact with water, it is also considered advantageous to perform said reaction in the substantial absence of water.

Upon substantial completion of the reaction, the excess unreacted dehydrating agent can be removed by distillation, preferably at reduced pressures. The distillation should be continued until the dehydrating agent is substantially removed.

Upon cooling, the reaction residue is preferably brought into admixture with water in amounts sufficient to hydrolyze and solvate the remaining dehydrating agent. The water is desirably maintained between temperatures of about 0° C. to 25° C. The precipitate of mono-cyano-di-p-xylylene can thereafter be isolated and purified by conventional means, e.g., filtration, washing, and recrystallization.

In another embodiment, the remaining dehydrating agent can be recycled and reused in subsequent reactions. In this embodiment, the addition of water is not considered necessary.

The following examples are cited to illustrate the invention and are not intended to limit it in any manner. All percentages and parts are by weight unless otherwise indicated.

*Example I*

A mixture of one part of mono-carboxy-di-p-xylylene and 6 parts of thionyl chloride was gently refluxed (about 78° C.) at atmospheric pressure, under a condenser for about one half hour and then poured slowly into 15 parts of cold, concentrated ammonium hydroxide. The copious white precipitate which formed was collected by filtration, washed well with water and recrystallized from a 95 percent ethanol solution to give an 85 percent yield of mono-carboxamido-di-p-xylylene having a melting point of 212–214° C. The structure was confirmed by infrared analysis showing absorptions at 2.65 and 5.95 microns which are characteristic of primary amides.

*Example II*

Repeating the experiment described in Example I under the same conditions, 3 parts of phosphorus trichloride is substituted for thionyl chloride also results in a high yield of mono-carboxamido-di-p-xylylene of good purity.

*Example III*

Repeating the experiment described in Example I under the same conditions and with the same amount of starting material except that phosphorus pentachloride is substituted for thionyl chloride also results in mono-carboxamido-di-p-xylylene equivalent to that recovered in Example I, having a melting point of about 213° C.

*Example IV*

A solution of 1 part of mono-carboxamido-di-p-xylylene as prepared in Example I in 15 parts of thionyl chloride was gently refluxed for about two hours and most of the excess thionyl chloride was then removed by distillation under reduced pressures of about 10 to 20 mm. Hg. The residue was cooled and poured carefully into an excess of ice water. The solid which precipitated was collected by filtration, washed thoroughly with dilute sodium hydroxide and water and recrystallized from 95% ethanol to give a better than 90% yield of mono-cyano-di-p-xylylene having a melting point of 118° C.

*Example V*

Repeating the same experiment described in Example IV under the same conditions and with the same amount of starting material except that phosphorus pentoxide is substituted for thionyl chloride results in good yield of mono-cyano-di-p-xylylene having acceptable purity, as indicated by the melting point of the product.

*Example VI*

Repeating the same experiment described in Example IV under the same conditions and with the same amount of starting material except that 10 parts phosphorus oxychloride is substituted for thionyl chloride results in mono-cyano-di-p-xylylene equivalent to that of Example IV.

The substituted di-p-xylylenes obtainable by the method of the present invention are particularly useful in the preparation of substituted poly-p-xylylenes. Moreover, the carboxamido compound serves also as a precursor in the synthesis of the cyano di-p-xylylene.

Polymers are prepared by the pyrolysis of these substituted cyclic dimers at temperatures of 450° to 700° C. to cleave the dimer into two reactive diradicals

and

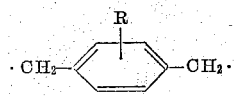

where R represents the carboxamido or cyano group. It is preferred that temperatures of about 550° C. to 600° C. be used to avoid excess tar and decomposition products at temperatures approaching 700° C. and very low conversion rates at temperatures of about 450° C–500° C. Cooling of the vaporous diradical to temperatures of about 120° to 130° C., where R is a cyano group, condenses only the cyano-p-xylylene diradicals into the linear poly(cyano di-p-xylylene) which can be represented by the structural formula:

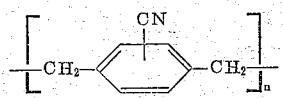

where $n$ indicates the number of repeating units of the polymer and can be an integer greater than 10 but can be as high as 10,000 or more. The uncondensed p-xylylene diradicals pass through the system to be later condensed in a lower temperature zone.

Poly(cyano-di-p-xylylene) can be classified as a high melting, tough, solvent-resistant polymer having a melting point above 260° C., tensile strength of about 8,700 p.s.i., tensile modulus of about 435,000 p.s.i., and an elongation at break between about 7–12%.

Cooling of the mixture of vaporous diradicals to lower temperatures, i.e., about room temperatures, yields a random copolymer represented by the structure

which is also a tough, high melting and solvent-resistant polymer.

These polymers can be stripped as a film from the condensing surface and used as films, tapes, etc., particularly where high solvent resistance is needed or high use temperatures encountered.

What is claimed is:
1. As a composition of matter, mono-cyano-di-p-xylylene.
2. As a composition of matter, mono-carboxamido-di-p-xylylene.

References Cited in the file of this patent

FOREIGN PATENTS 519,888    Great Britain _____ Apr. 9, 1940

OTHER REFERENCES

Cram et al.: Journal of American Chemical Society, June 20, 1958, vol. 80, pp. 3127–3132 (page 3127 relied on).

Degering et al.: An Outline of Organic Nitrogen Compounds, 1945, p. 536.